United States Patent [19]

Damiano et al.

[11] Patent Number: 4,543,716

[45] Date of Patent: Oct. 1, 1985

[54] METHOD AND APPARATUS FOR ELECTRICAL CONNECTION OF FLAT CABLES

[75] Inventors: Ralph R. Damiano, Naugatuck; Charles A. Whitney, Canton, both of Conn.

[73] Assignee: The Wiremold Company, West Hartford, Conn.

[21] Appl. No.: 535,293

[22] Filed: Sep. 23, 1983

[51] Int. Cl.[4] ........................ H01R 43/04; B23P 19/00

[52] U.S. Cl. .......................................... 29/871; 29/747; 227/141; 269/903

[58] Field of Search ................. 29/871, 868, 747, 432, 29/432.1; 339/17 F, 97 C, 117 FF, 18 C; 174/88 R, 84 C; 227/87.3, 303, 903, 141, 147; 269/903, 303

[56] References Cited

U.S. PATENT DOCUMENTS

| | | | |
|---|---|---|---|
| 3,013,271 | 12/1961 | Carpinella | 227/141 |
| 3,013,272 | 12/1961 | Barratt | 227/141 |
| 3,713,072 | 1/1973 | Henschen et al. | 339/17 F |
| 4,249,303 | 2/1981 | Weinmann et al. | 29/868 |
| 4,255,612 | 3/1981 | Grundfest | 174/117 FF X |
| 4,258,974 | 3/1981 | Kuo et al. | 339/17 F X |
| 4,259,778 | 4/1981 | Greenwood | 29/747 X |
| 4,263,474 | 4/1981 | Tennant | 339/276 R X |
| 4,391,037 | 7/1983 | Giasini | 29/432 X |

OTHER PUBLICATIONS

Electronic Design, Oct. 15, 1958, pp. 24–25.

*Primary Examiner*—Howard N. Goldberg
*Assistant Examiner*—Carl J. Arbes
*Attorney, Agent, or Firm*—Hayes & Reinsmith

[57] ABSTRACT

To effect a mechanical and electrical interconnection of high integrity between flat multiconductor cables, a jig system is disclosed wherein a base plate is specifically designed with a plurality of guide pins arranged in a predetermined pattern for locating a plurality of common length connector strips for establishing connections between matching cable conductor pairs. The base plate further includes a plurality of locator pins for precision alignment of 3, 4, or 5 conductor cables for either tap or splice connections with the cables juxtaposed. The cables are in overlying relation to connector strip eyelets at opposite ends of each strip for establishing a connection between a matching conductor pair. A top plate is assembled with tool receiving apertures registrable in alignment with the connector strip eyelets, and an impact tool is driven into each top plate aperture to make connection between the strip and matching conductors only after precision alignment of the strips and cables between the plates is assured.

23 Claims, 30 Drawing Figures

METHOD AND APPARATUS FOR ELECTRICAL CONNECTION OF FLAT CABLES

FIELD OF INVENTION

This invention generally relates to a method and apparatus for making electrical connections and particularly concerns electrical interconnection of flat multiconductor cables for undercarpet use.

BACKGROUND OF THE INVENTION

This invention is intended for use with a high-flexibility undercarpet wiring system for branch circuit power distribution, generally in open office areas, for example, wherein flat cable is utilized for connection to wall, baseboard or underfloor wiring systems. As an example, feed wiring from a suitable raceway may be brought into and connected to a suitable transition connector such as a device fully described in U.S. patent application Ser. No. 534,203 entitled "Flat Cable Transition Connector" and assigned to the assignee of this invention. A feed end of a flat multiconductor cable is connected to the transition connector and installed with proper techniques on a floor surface in accordance with predetermined runs to selected power and communication outlets such as established by floor pedestals and the like which in turn utilize transition connectors for transition from the flat multiconductor cable to round wire for power, telephone and data wiring.

In the undercarpet wiring system of the assignee of this application, an aim is to maintain the thickness of electrically innerconnected cables to a minimum dimension. Known arrangements have utilized multiconductor cables arranged in longitudinally abutting relation for splices or in 90° abutting relation for taps. Cables arranged in mutual overlapping relation are known such as in U.S. Pat. No. Re. 31,336. To minimize the thickness of cable interconnection, it is desired to avoid such cable overlapping. A variety of different contact connector strips have also been developed wherein each require individual alignment for each separate connection of each conductor pair. Such known arrangements commonly require use of various strips of different dimensions for interconnecting conductor pairs and frequently require partially perforated flat cables to achieve connections between cable and contact connector strips.

In the case of a splice connection, individual cable conductors are aligned, and a connection may be made between cables in longitudinally abutting relation without any significant confusion during installation. In the case of a tap connection however, there is more likelihood of connection error. The cables must be connected or arranged in orthogonal abutting relation. Each conductor of each cable thereby runs in a direction normal to all conductors of the other cable, and there is a possibility of one conductor of one cable being connected in error to plural conductors of the other cable.

These problems in the past have been addressed by trying to eliminate installation confusion by using different length connector strips for each connection to be made. However, such an approach may require as many as five different length connectors to be available, for example, for 3, 4, or 5 phase taps with neutral and ground carried through, and requires selective choices by an installer to determine the correct length connector strip and obviously additionally requires an undesired inventory of different length connector strips.

In the system of the assignee of this invention, a single common sized connector is used throughout for either tap or splice applications for 3, 4 or 5 conductor systems in cooperation with a unique jig for ease of installation. Accordingly, no need exists for different sized connectors during installation, and there is no need for concern on the part of an installer with regard to proper connector strip selection or orientation. Moreover, the jig of this invention significantly enchances the ease and simplicity of error-free installation.

SUMMARY OF THE INVENTION

An object of this invention is to provide a new and improved method for electrically interconnecting multiconductor cables.

A related object of this invention is to provide such a method of electrically interconnecting flat multiconductor cables arranged in abutting relation either in longitudinally aligned relation for splices or in orthogonal abutting relation for taps.

Another object of this invention is to provide a new and improved jig for assuring proper alignment of contact connector strips and cables and securing that alignment before actually making any desired connection to selected conductor pairs. The jig of this invention further assures that all cable conductors are properly aligned and in position to be connected before such connections are made. A related object is the provision of a new and improved contact connector strip for use with the unique jig of this invention.

The subject invention provides a jig wherein a base template or plate serves dual purposes as both a contact strip locator and also as a cable locator. A top template or plate is mounted in position overlying the base plate once all contact connector strips and cables are in position. The top plate further serves to indicate proper alignment of the contact strips, as well as proper alignment and orientation of conductor pairs of the respective cables to be connected prior to any further step in actually making desired connections between conductor pairs.

DESCRIPTION OF A PREFERRED EMBODIMENT

Figure 1:
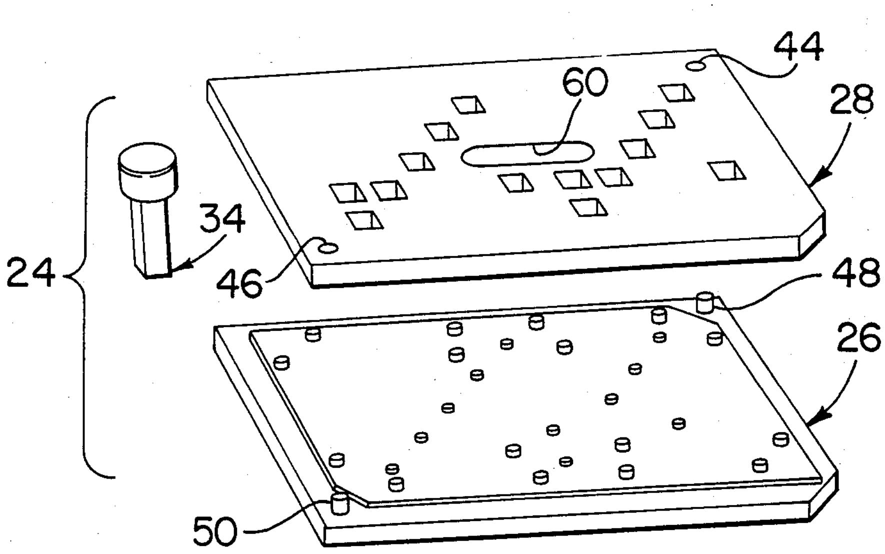
FIG. 1 is an isometric view showing certain components of the jig of this invention.

Flat multiconductor cables such as at 10 and 12 (FIG. 11A) includes a plurality of flat electrical conductors such as at 14 (FIGS. 8–10) enveloped by opposed plastic sheets 16, 18 comprising an electrically insulative casing 20. The flat electrical conductors 14, preferably formed from copper, extend in parallel spaced alignment along the length of each cable 10,12. Each multiconductor cable includes a grounding conductor the casing of which will be understood to be color coded and designated green (or G) in the drawings and a neutral conductor designated white (or W). A basic three conductor flat cable shown at 10 in FIG. 11A has a third "hot" conductor designated black (or BK); a four conductor flat cable 22 (FIGS. 15A, 15B) has a further "hot" conductor designated red (or R); and the five conductor cable 12 illustrated in FIGS. 11A and 12A has yet another "hot" conductor designated blue (or B). It will be understood that all of these conductors are color coded on insulated casing 20, preferably along a center line of the respective conductors.

To connect such multiconductor flat cables over the course of a run between a feed point and outlet, a jig generally designated 24 is provided in accordance with this invention for connecting cables in abutting relation for splices or for taps, as necessary, while maintaining a minimum height profile. To further minimize time and cost of installation in a quick and easy system, jig 24 includes a pair of templates or plates which include a base plate 26, which serves both as a contact strip locator and a cable locator, and an apertured top plate 28 which, upon being mounted in position, both secures and indicates proper alignment of contact strips and cables before any application of force to make desired connections between conductor pairs.

Figure 2:
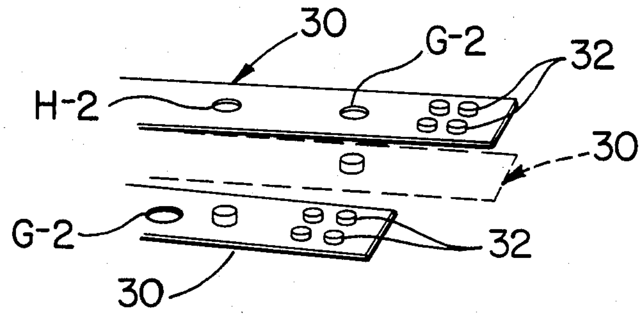
FIG. 2 is an isometric view, partly broken away, showing a contact connector strip in disassembled and assembled relation to a guide pin of a base plate of the jig of FIG. 1.
Figure 7:
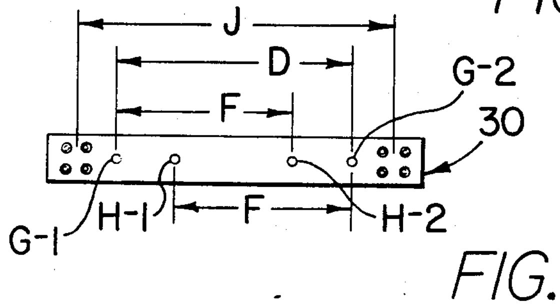
FIG. 7 is a plan view of a contact connector strip used in making connection between conductor pairs in accordance with the teachings of this invention.
Figure 8:
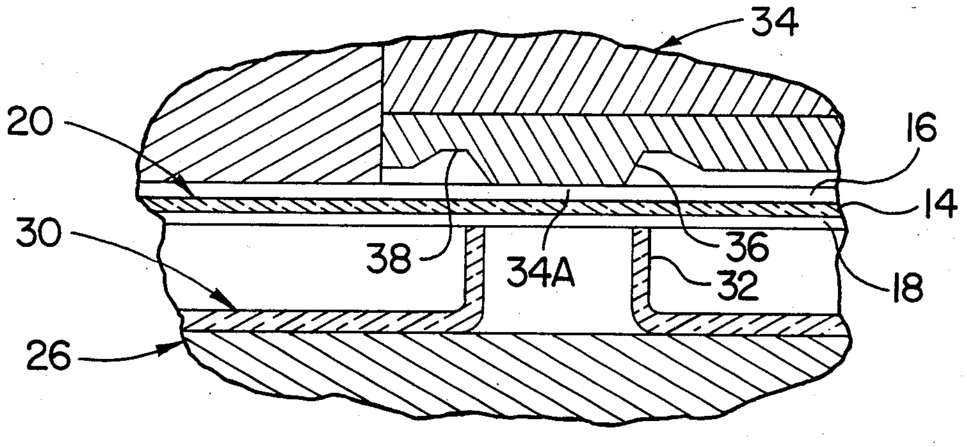
FIGS. 8–10 are enlarged elevational views showing sequential stages of the making of a connection by a single impact blow in accordance with the teachings of this invention.
Figure 9:
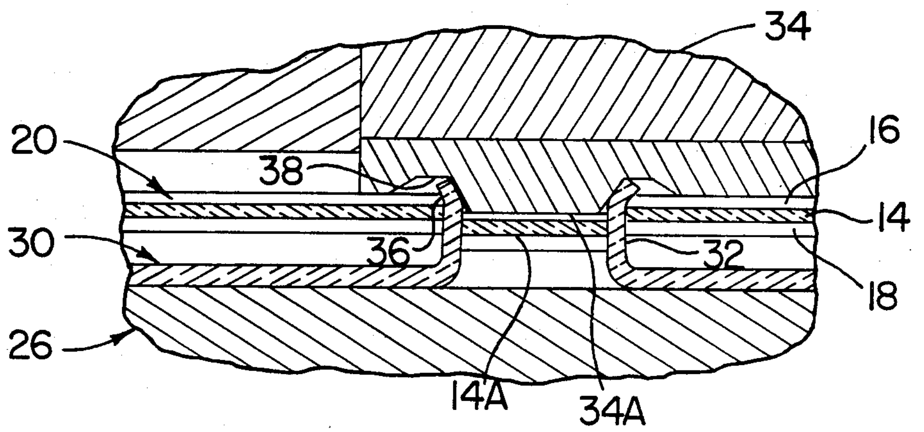
Figure 10:
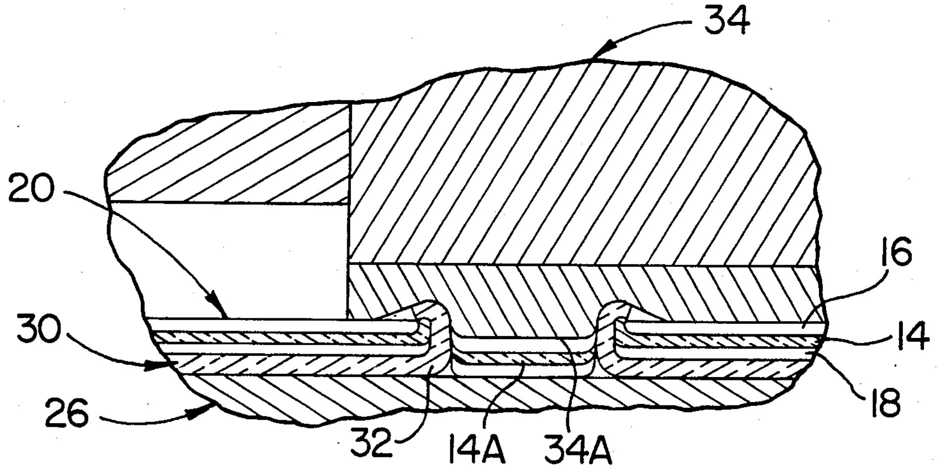

In the specifically illustrated embodiment, a contact connector strip 30 is illustrated FIG. 7 as a flat bar having a four eyelet pattern at opposite longitudinal ends of the bar. The four eyelet pattern is provided in a double ended array on the strip 30 to assure 90° symmetry in a four hole pattern regardless of which way contact strip 30 is arranged for either splicing or tapping conductor pairs, whereby the same amount of conductive copper cross sectional contact area is achieved around each eyelet 32 (FIG. 2) of strip 30. The latter is preferably formed of suitable electrically conductive material such as brass. The strip eyelets 32 accordingly jointly provide a predetermined cross sectional contact area. Referring to FIGS. 8–10, upon driving a selected conductor 14 of a flat cable into an eyelet 32, the latter serves to pierce a circular section 14A within the confines of each eyelet 32, and the action of a suitable impact tool 34 extrudes the surrounding copper conductor 14 against brass eyelet 32 and bottoms out to crimp or roll the brass eyelet 32 over the copper conductor 14 to establish an electrical connection of high integrity coupled with a secure mechanical clinch for an assured mechanical connection.

More specifically, an operative face on an end of impact tool 34 is illustrated as having an impact head of frustoconical cross section with an end 34A of the face dimensioned to be received within the confines of each eyelet 32 of the contact strip 30. An inclined side wall 36 and flared shoulders 38 of the impact head of tool 34 serve to roll an upstanding circular rim of eyelet 32 radially outwardly (FIG. 9) into a final crimped position (FIG. 10) with the rim of the brass eyelet rolled over copper conductor 14.

It will be understood that the face of impact tool 34 has four such impact heads in an array precisely corresponding to the four eyelet array on each end of strip 30.

Such action is achieved by a single impact blow from hammer 40 to achieve a secure clinch and improved machanical seating, while at the same time effecting a wiping action on an outer surface of each eyelet 32 against copper conductor 14 to eliminate undesired film or surface contaminants for an electrical connection of desired high integrity. By the provision of tool 34 having four such frustoconical impact heads dimensioned and configured to correspond to the eyelet pattern on each end of contact strip 30, each of the four eyelets 32 of each array may be simultaneously connected to a selected conductor 14 with a single hammer blow.

Figure 5:
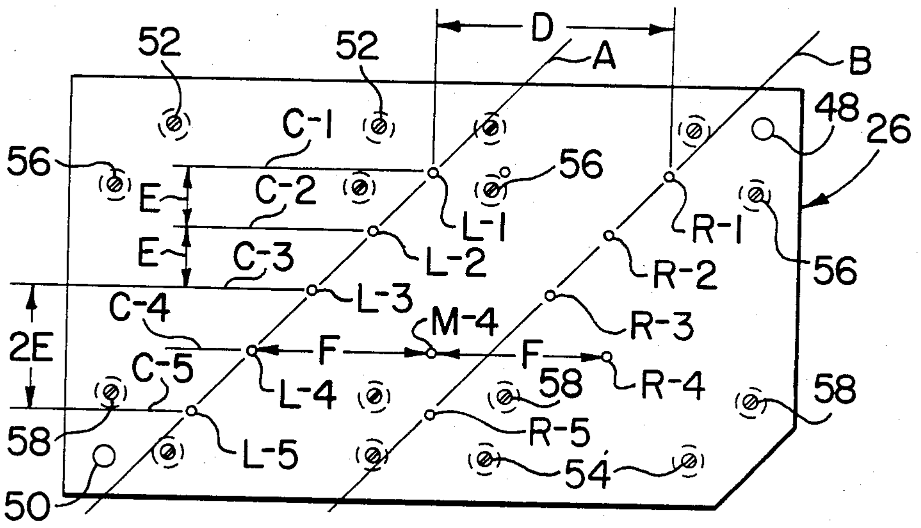
FIG. 5 is an enlarged plan view of a base plate of the jig of FIG. 1.
Figure 6:
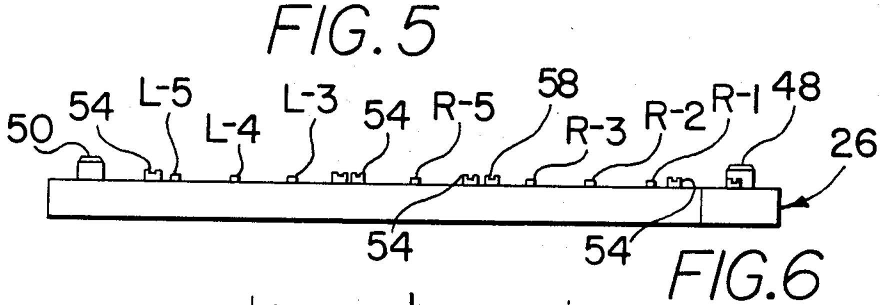
FIG. 6 is an elevational view of the base plate of FIG. 5.

In the specifically illustrated embodiment, base plate 26 of jig 24 includes a plurality of guide pins for selectively fixing each individual contact strip 30 relative to a pair of juxtaposed flat multiconductor cables. To minimize the number of guide pins for use in selectively connecting 3, 4 or 5 conductor cables in different combinations for either tap or splice cable orientation, coupled with a simplified use of jig 24, a predetermined pattern of guide pins is incorporated in this invention which is particularly suited for minimizing any likelihood of connection error in a highly flexible, compact jig 24. As best seen in FIG. 5, a plurality of guide pins are fixed to base plate 26 along parallel axes A and B providing multiple pairs of guide pins L-1, R-1 and L-2, R-2 and L-3, R-3, with each such pair of pins equally spaced from one another a distance D. Each such pair of pins respectively defines location of a line C-1, C-2 and C-3 with the line so defined by each pair of pins being parallel to the next adjacent line and corresponding to predetermined center lines of the conductors of the flat cables.

Another pair of guide pins L-5, R-5 are fixed to base plate 26 on axes A and B (FIG. 5) spaced apart a distance D. Pins L-5, R-5 define a line C-5 parallel to and spaced from line C-3 at a distance 2E, twice the distance E between each of the above described three pairs of guide pins.

For quick and easy tap and splice applications, regardless of any desired connection between cables with varying numbers of conductors, three additional guide pins L-4, M-4 and R-4 are shown located in colinear relation along line C-4. Line C-4 is located precisely midway between lines C-3 and C-5 with pin L-4 located on axis A at a distance F from the next adjacent guide pin M-4 which is equally spaced from guide pin R-4 the same distance F, whereby guide pin M-4 is centered between pins L-4 and R-4 on line C-4 in aligned relation to pins L-1 and R-5, respectively, on lines C-1 and C-5.

To provide a single unique length strip 30 for use with a variety of connections between different conductor pairs in accordance with the teachings of this invention, each contact connector strip 30 (FIG. 7) is formed with a pair of aligned openings G-1, G-2 spaced apart a distance D corresponding to the common spacing between the respective pairs of guide pins L-1, R-1 and L-2, R-2 and L-3, R-3 and L-5, R-5. A second pair of openings H-1 and H-2 are also formed in strip 30 in colinear relation to openings G-1, G-2, along a center line of strip 30, with opening H-1 being spaced from opening G-2 a distance F corresponding to the distance between pin M-4 and its adjacant pins L-4 and R-4, and with opening H-2 being spaced the same distance F from opening G-1.

Such construction provides for use of the single length strip 30 to be precisely aligned along any selected line C-1, C-2, C-3, C-4 or C-5 between any selected pair of guide pins along such lines and without regard to which longitudinal end of contact connector strip 30 is placed on either pin of a selected pair, thereby further minimzing any selection concern of an installer.

Figure 4:
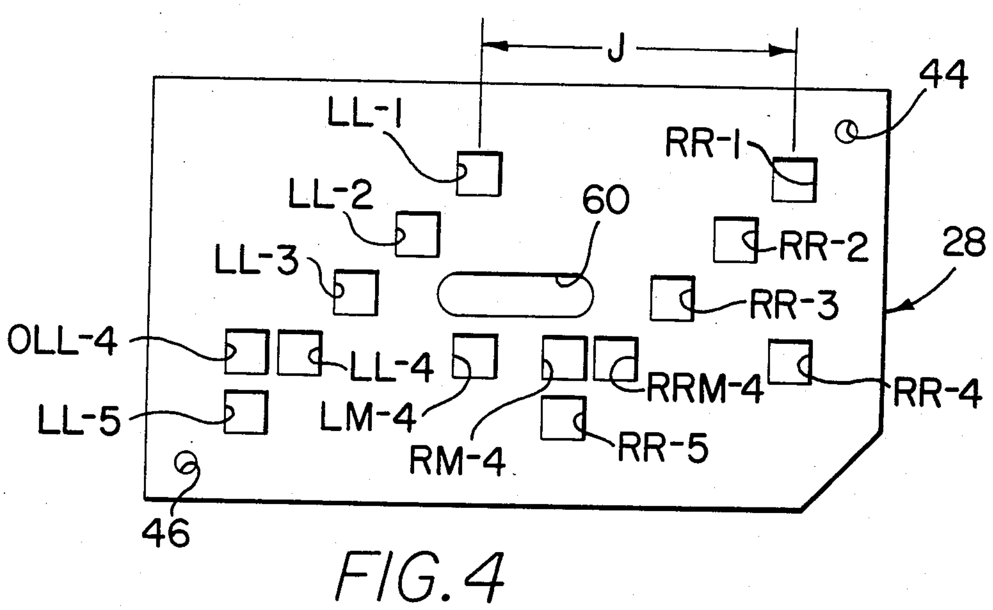
FIG. 4 is an enlarged plan view of a top plate of the jig of FIG. 1.

The base plate 26 of jig 24 not only serves as a contact strip locator but also serves to precisely align location of the cables relative to contact strips 30 whereby top plate 28 may be mounted in overlying relation to base plate 26 to secure the components in position. Top plate 28 is provided with a pair of apertures LL-1, RR-1, the distance between centers of which is a dimension J (FIG. 4) which corresponds precisely to the distance J between centers of the four eyelet array (FIG. 7) at opposite longitudinal ends of strip 30. The centers of each aperture LL-1 and RR-1 are in precise overlying relation to line C-1 upon mounting top plate 28 on base plate 26. To assist in such precision mounting, top plate 28 is illustrated as having a pair of circular openings 44, 46 at diagonally opposed corners which register with projecting posts 48, 50 protruding upwardly from corresponding corners of base plate 26.

This same arrangement of corresponding pairs of top plate apertures such as LL-2, RR-2 and LL-3, RR-3 and LL-5, RR-5 in top plate 28 are respectively spaced apart a distance J such that assembly of top plate 28 with the base plate 26 also centers these pairs of apertures respectively on lines C-2, C-3 and C-5 of base plate 26.

To permit maximum flexibility in the connections of different cables, a series of longitudinally aligned apertures are formed in top plate 28 with the centers of such apertures aligned with line C-4 upon assembly of plates 26, 28. It will be noted that apertures LL-4 and RRM-4 are respectively aligned with the previously described corresponding four pairs of top plate apertures LL-1, RR-1 and LL-2, RR-2 and LL-3, RR-3 and LL-5, RR-5 are spaced apart the same common distance J. Another aperture pair OLL-4 and RM-4 are likewise spaced part distance J and are respectively aligned with aperture pair LL-5, RR-5 which overlie adjacent line C-5 when plates 26, 28 are assembled. Aperture pair LM-4, RR-4 are spaced apart distance J and are respectively aligned with aperture pair LL-1, RR-1 which overlie line C-1 when plates 26, 28 are assembled. All of the above described top plate apertures will be understood to be dimensioned and configured to receive the punch end of impact tool 34 for making the connections as described above between selected conductor pairs.

Figure 11:
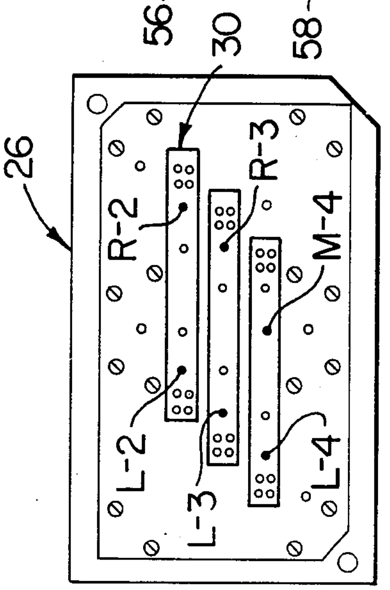
FIGS. 11–11B are plan views showing certain sequential steps in accordance with this invention for making a 5 to 3 conductor tap.
Figure 11A:
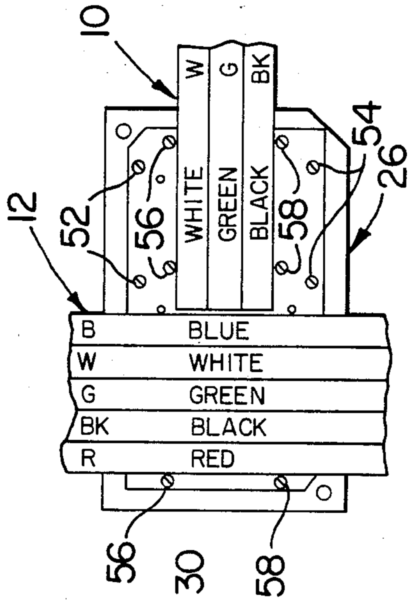
FIGS. 11C–11D are plan views similar to FIGS. 11–11B to make a 3 to 5 conductor tap utilizing the same arrangement of contact connector strips as shown in FIG. 11.
Figure 11B:
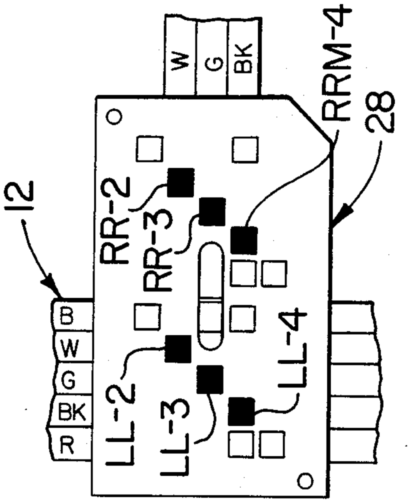
Figure 11C:
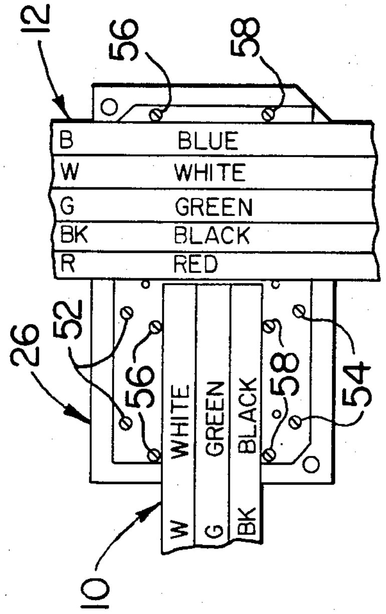
Figure 11D:
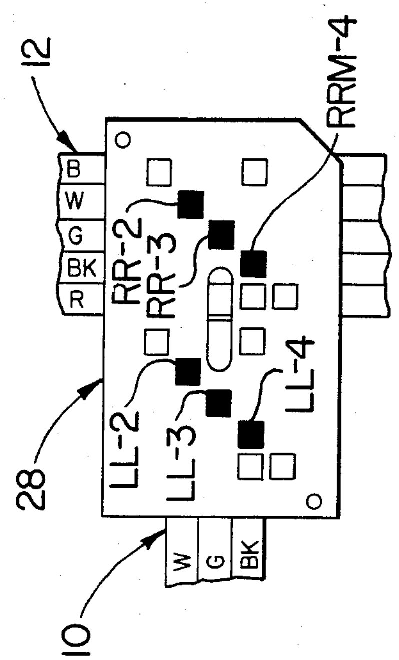

Turning now to the use of the described jig 24 in its application to effect selected connections between preselected conductors of flat multiconductor cables, reference is made to FIGS. 11–11D. By virtue of the above described jig construction, its application and use is so simplified as to be seemingly incompatible with the wide variety of different connections which may be made between combinations of flat cables having 3, 4 or 5 conductors in either tap or splice arrangements for differing electrical connection demands in the field. For easy understanding, a basic three phase cable such as at 10 may have a white neutral conductor, a green grounding conductor and a black "hot" conductor. When a cable having four or five conductors is desired, it will be understood that a color coded blue and/or red "hot" conductor may be added adjacent the (color coded) white neutral and black "hot" conductors respectively. Each of these conductors are of equal size and extend in longitudinally aligned parallel relation within the flat multiconductor cable wherein the center lines of each of the adjacent conductors are equally spaced apart.

Basic tap connections are illustrated in FIGS. 11–11D wherein a five conductor cable 12 is tapped off from a blue conductor side to the described basic three conductor cable 10 as best seen in FIG. 11A. In this application, three contact strips 30 are respectively mounted on base plate 26 along lines C-2, C-3 and C-4 (FIG. 5). The upper two contact strips 30 are fixed to base plate 26 upon registering holes G-1 and G-2 (FIG. 7) of these respective strips 30 on lines C-2 and C-3 respectively with guide pins L-2, R-2 and L-3, R-3 (FIG. 11). A lower contact strip is placed on plate 26 in alignment with the upper two contact strips 30 upon registering opening s G-1, H-2 respectively with guide pins L-4, M-4 which are spaced apart a distance "F" as described above. Accordingly, to tap off from the blue conductor side of the five conductor cable 12, apertures LL-2 and RR-2 of top plate 28 (FIG. 11B) will reflect the color coded white conductor; apertures LL-3 and RR-3 reflect the matching green grounding conductors; and top plate apertures LL-4 and RRM-4 will show the black conductors of the two cables to be connected. For each in understanding, these apertures are shown as being in solid black in the drawings wherein matching cable conductor pairs are established by jig 24. Accordingly, contact strips 30 and their respective cables 10, 12 are positively and precisely aligned with one another prior to any mechanical and electrical connection being made between matching conductors of the respective cables. Tap-off of these same cables maybe made in reverse orientation as seen in FIGS. 11C, 11D without any change in location of contact strips 30 on base plate 26. For this reason, the other examples illustrated in FIGS. 12–15 show only tap-off connections from the blue conductor side of the five conductor cable 12 although it is to be understood the reverse application from the red conductor side as in 11C may be effected without changing the contact strip orientation in the examples illustrated. A basic rule for an installer in orienting the cables is to provide the grounding (green) conductor in a central position with the neutral (white) conductor to the right or above the grounding (green) conductor, regardless of whether one is tapping off to the left (from the red "hot" conductor) or to the right (from the blue "hot" conductor) of cable 12.

Figure 14:
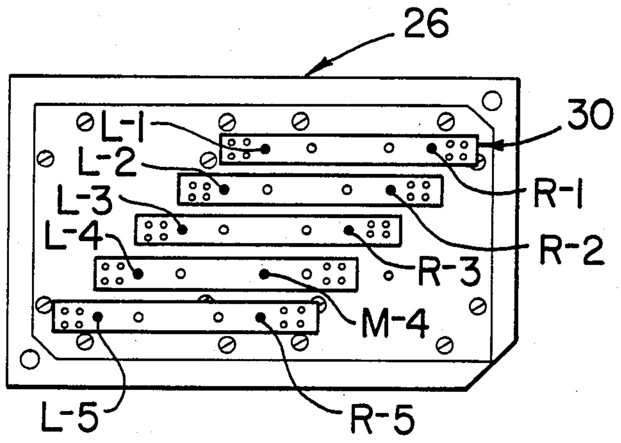
FIGS. 14–14B are plan views similar to FIGS. 11–11B showing a 5 to 5 conductor tap.
Figure 14A:
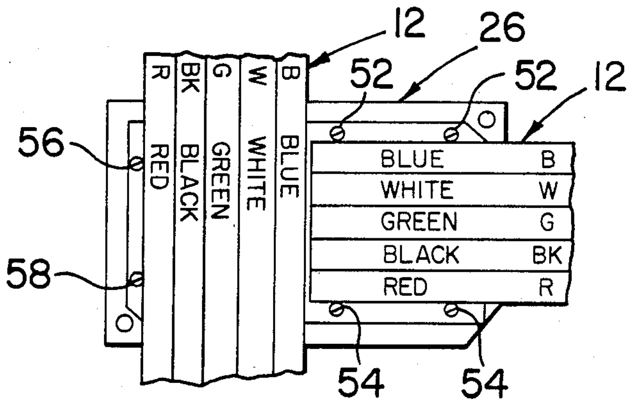
Figure 14B:
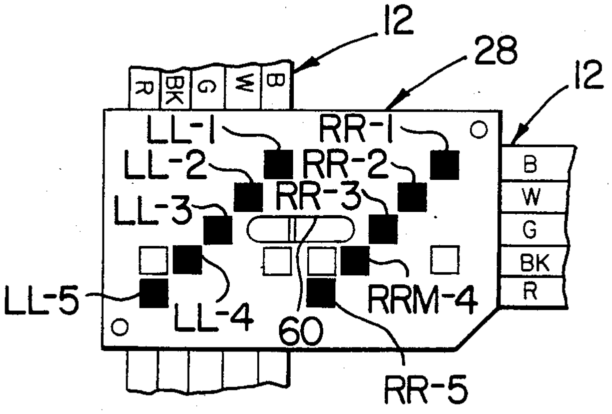
Figure 15:
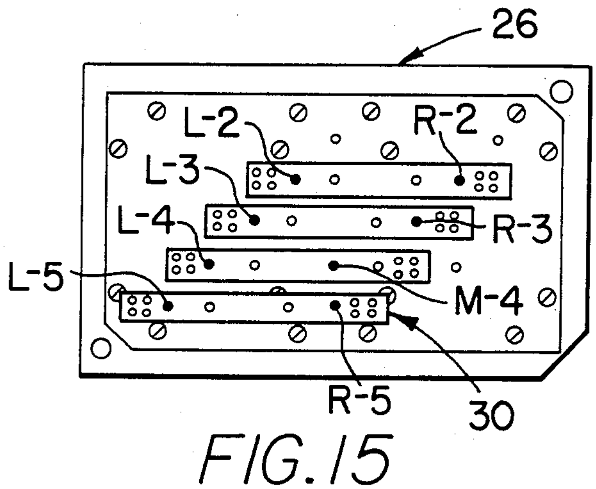
FIGS. 15–15B are plan views similar to FIGS. 11–11B showing a 5 to 4 conductor tap.
Figure 15A:
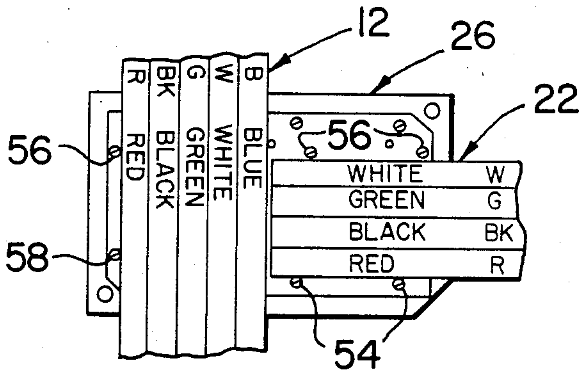
Figure 15B:
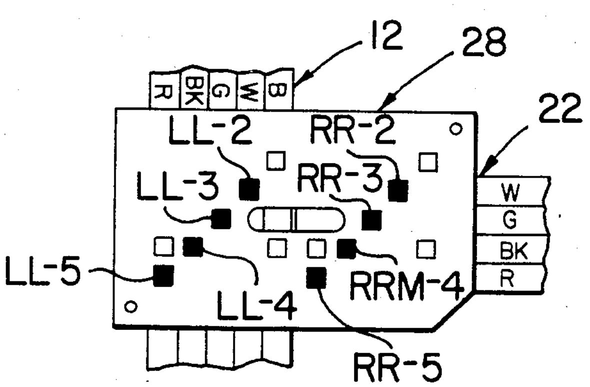
Figure 16:
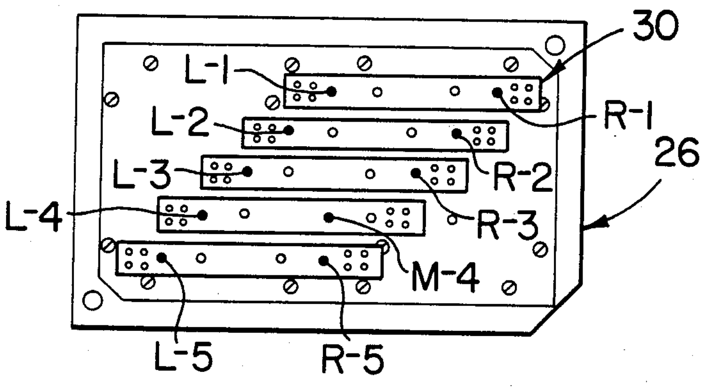
FIGS. 16–16B are plan views similar to FIGS. 11–11B showing a 5 to 5 conductor splice.
Figure 16A:
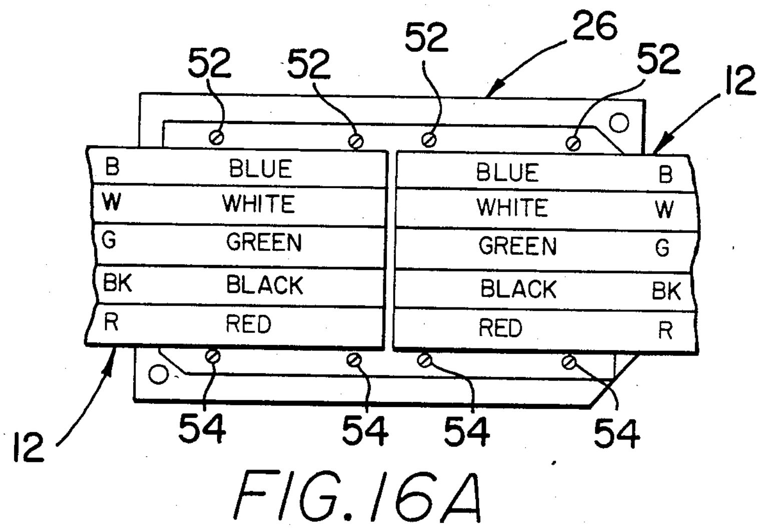
Figure 16B:
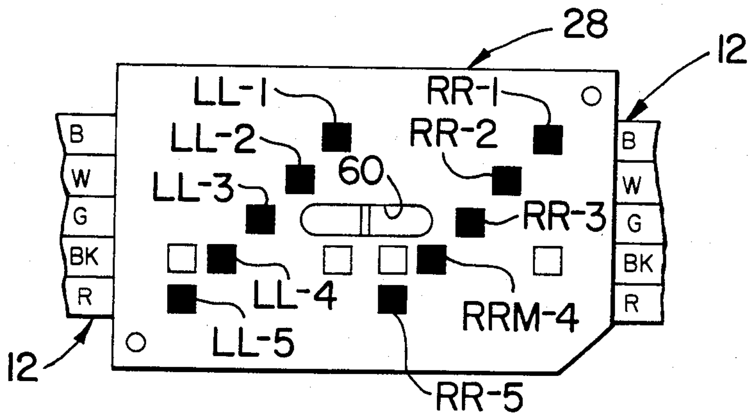

To ensure precision alignment of such cables, base plate 26 preferably is provided with a plurality of locator pins. These locator pins are mounted in base plate 26 in a predetermined pattern wherein the pins such as at 52 and 54 which are aligned along opposite longitudinally extending outboard edges of base plate 26 are positioned to precisely establish a five conductor cable 12 in position for either a tapping application (FIG. 14A) or a splicing application (FIG. 16A). An inside aligned set of pins such as at 56 and 58 adjacent each outboard set of locator pins 52 and 54 respectively are provided to establish the position of a three conductor cable such as at 10 for a tapping application such as illustrated in FIGS. 11A and 11C, for example, and these inside aligned sets of pins 56 and 58 may also be utilized in conjunction with an outboard set of locator pins 52 or 54 as illustrated in FIG. 15A to establish the position of a four conductor cable 22 for a tapping application. In addition, certain pins serve dual functions, for example, pins 56 and 58 adjacent opposite lateral sides of base plate 26 serve to establish a five conductor cable 12 in a properly aligned position for a tapping application as best seen in FIGS. 11A and 11C.

It will be understood that each of the locator pins may be resiliently mounted in the base plate 26 for selective positioning between an operative position wherein the locator pin protrudes above a plane containing an upper surface of base plate 26 and an inoperative position wherein the locator pin is located flush with the base plate surface. For this purpose, the locator pins may be conventionally mounted to permit alternate locking and release every one quarter turn or 90° rotation of the pin by applying a tool to a screw driver slot in the head of each pin, whereby that pin may be depressed and locked flush with base plate 26 against the biasing force of a coil spring (not shown) seated in an opening in plate 26 for receiving the pin.

Figure 12:
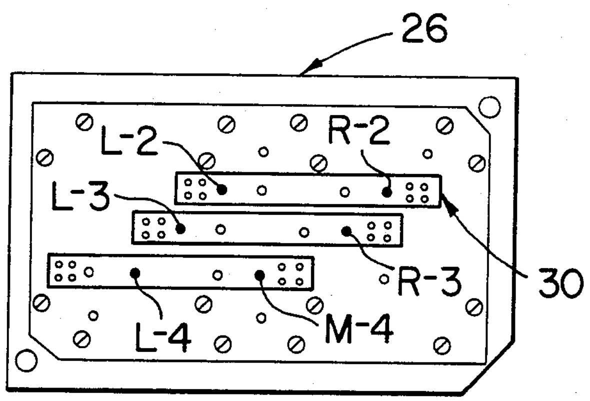
FIGS. 12–12B are plan views showing another 5 to 3 conductor tap similar to that illustrated in FIGS. 11–11B.
Figure 12A:
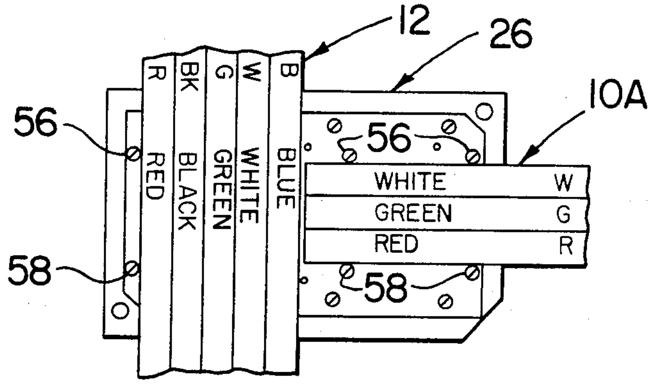
Figure 12B:
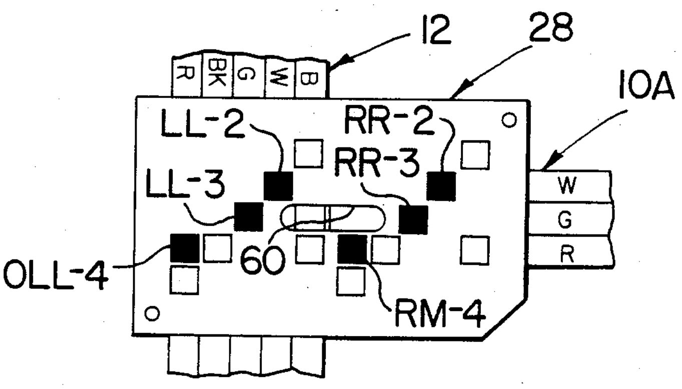
Figure 13:
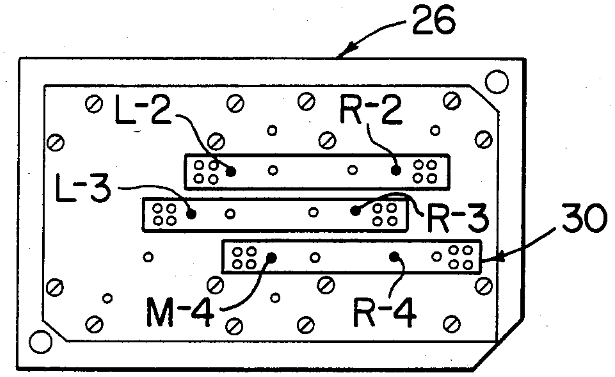
FIGS. 13–13B are plan views similar to FIGS. 11–11B and showing yet another 5 to 3 conductor tap.
Figure 13A:
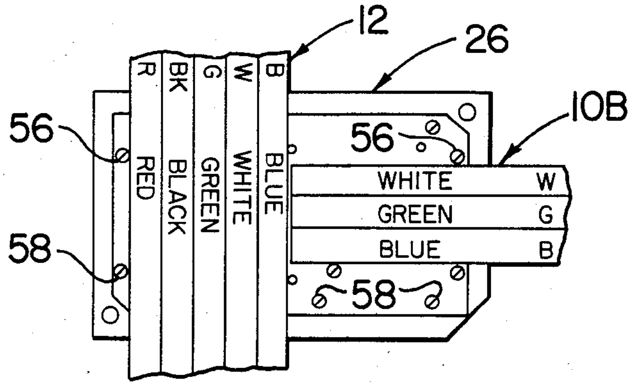
Figure 13B:
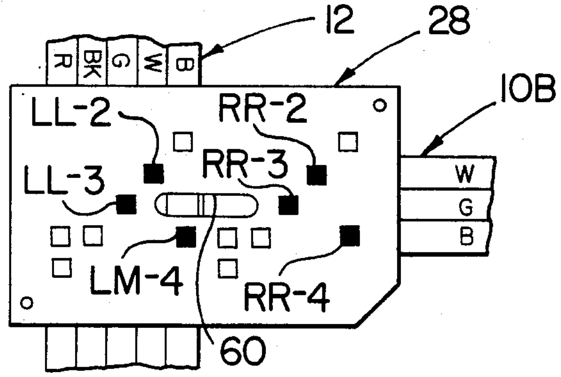

To continue to maintain a relatively compact overall envelope for the jig 24 and to prevent interference of any guide pin in line C-4 of base plate 26 along axis B (FIG. 5) when a tap connection is to be made between a five connector cable 12 and a three conductor cable as illustrated at 10A in FIG. 12A wherein a "hot" red to red conductor pair connection is to be made between cables, guide pin M-4 on line C-4 of base plate 26 is offset from axis B so as to be colinear with a line established by guide pins L-1 and R-5 at a distance F midway between pins L-4 and R-4 on line C-4. Such construction additionally permits guide pin R-4 to be utilized in a tap connection wherein contact strip 30 on line C-4 is offset to the right (as viewed in the drawings) to establish a contact connection between blue conductors (FIG. 13A) of the respective cables 12, 10B in the illustrated tap-off from the blue conductor side of five conductor cable 12 to three conductor cable 10B (FIGS. 13–13B). Such construction additionally permits the same offset guide pin M-4 in line C-4 to be used upon simply translating a strip 30 to the left (as viewed in the drawings) to be used in conjunction with guide pin L-4 (FIG. 12) in making the illustrated tap-off connection shown in FIGS. 12–12B to establish a contact connection when desired between the red conductor pair of the five conductor cable 12 and three conductor cable 10A having a "hot" red conductor (FIGS. 12A, 12B).

Accordingly, it will be seen that with the particular pin pattern disclosed and established by jig 24 and the unique length strip 30, the right side outboard guide pin R-4 in line C-4 of base plate 26 need be used only once to provide a desired tap-off connection between a blue conductor pair of the five and three conductor cable connection as illustrated in FIGS. 13–13B. Moreover, the openings G-1, G-2 (FIG. 7) adjacent the four eyelet arrays at opposite longitudinal ends of contact strips 30 are utilized to locate that strip in all positions on base plate 26 except the one position wherein a contact strip 30 is disposed on line C-4 with alternate combinations of openings G-1, H-2 or H-1, G-2 respectively spaced apart a distance F to align and secure a contact strip 30 in the tap-off connections illustrated in FIGS. 12A, 13A, 14A and 15A as well as in the splice connection on line C-4 illustrated in FIG. 16A.

Figure 3:
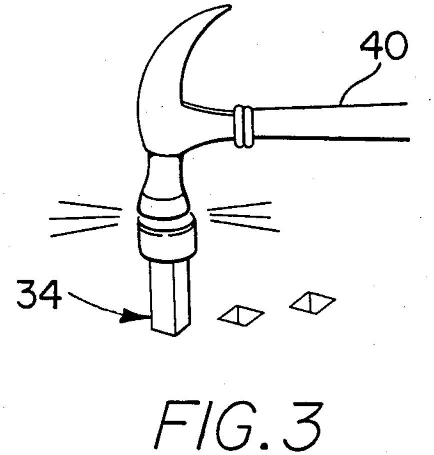
FIG. 3 is an isometric view illustrating the use of a contact crimping tool applied through an apertured top plate of the jig of FIG. 1. for making a connection with a single blow of the illustrated hammer.

From the foregoing disclosure, it will be understood that the apparatus and method of this invention provides for the base plate 26 serving as a contact locator and the contact strips 30 are accordingly placed in position on base plate 26 in properly aligned fashion for a preselected electrical connection between desired multiconductor flat cables. The latter are in turn located by the described locator pins in precision aligned position relative to the underlying contact strips 30 and, upon mounting top plate 28 in registration with base plate 26, proper cable alignment is reflected through a central top plate viewing aperture 60 while the top plate cable matching apertures assure proper alignment of correspondingly color coded conductors of the respective cables prior to application of any force to make the desired electrical and mechanical connections. No force whatsoever is applied until all components are properly aligned and upon assembly of the top plate 28 in proper position. The cooperating guide pins and locator pins assure alignment of the contact strips 30 and cables and such alignment is preserved by top plate 28. Thereafter, the head of the crimping tool 34 is simply inserted into the proper cable matching apertures of top plate 28 and a single hammer blow to tool 34 (FIG. 3) serves to effect piercing of the cable, and extruding of copper conductor 14 against brass eyelet 32 which in turn is crimped to roll its brass material over copper conductor 14 upon bottoming of the crimping tool to form a mechanical and electrical connection of high integrity.

As will be apparent to persons skilled in the art, various modifications, adaptations and variations of the foregoing specific disclosure can be made without departing from the teachings of this invention.

We claim:

1. For use in splicing or tapping a plurality of electrically conductive connector strips to a pair of flat multiconductor cables arranged in abutting juxtaposed relation to one another, a jig system comprising a base plate having a plurality of cable locating means and guide means thereon, a plurality of cable perforating connector strips fixed on the base plate by the guide means in a predetermined pattern relative to a pair of abutting juxtaposed cables having matching conductor pairs to be connected by the connector strips, and a top plate adapted to be mounted on the base plate in overlying relation to the plurality of connector strips, the top plate having tool apertures therein corresponding to the connector strips and to the matching conductor pairs of the cables to be connected.

2. The jig system of claim 1 wherein the guide means comprises pins aligned in multiple parallel rows with the spacing between adjacent rows of guide pins corresponding to the spacing between longitudinally extending axes of adjacent conductors of each cable.

3. The jig system of claim 2 wherein the spacing between longitudinally extending axes of adjacent cable conductors of each cable is a common dimension.

4. The jig system of claim 2 wherein the connector strips each have a cable perforating eyelet at each of its opposite longitudinal ends, wherein the guide pins of the base plate and the connector strips cooperate to provide selective registration of eyelets at opposite ends of each strip with corresponding matching conductors of the cables, and wherein the top plate tool apertures are registrable with each such selected position of the connector strip eyelets.

5. The jig system of claim 4 wherein five parallel rows of guide pins are provided on the base plate, and wherein one row of guide pins includes three guide pins with adjacent pins equally spaced apart at a predetermined distance.

6. The jig system of claim 5 wherein one of the cables has a given number of conductors and the other of the cables has at least one conductor more than said given number, and wherein said one row of guide pins provides selective positioning of a connector strip therein for providing registration of the connector strip eyelets at opposite ends of such strip respectively with one conductor of said one cable and with a selected matching one of plural conductors of said other cable.

7. The jig system of claim 5 wherein the remaining four rows of guide pins each include a single pair of guide pins spaced apart at a common preselected distance greater than said predetermined distance between adjacent pins of said one row of guide pins.

8. The jig system of claim 7 wherein the connector strips are each of a common length, wherein the eyelets at opposite longitudinal ends of each strip are spaced apart a common distance, and wherein a plurality of guide pin receiving openings are formed along a major axis of each strip with selected openings being spaced from one another at a distance equal to said predetermined distance between adjacent pins of said one row of guide pins and also with selected guide pin openings being spaced from one another at a distance equal to said common preselected distance between each single pair of guide pins in the remaining four rows of guide pins.

9. The jig system of claim 7 wherein the pairs of pins in the remaining rows of guide pins are offset relative to one another with corresponding pins of the pairs located along parallel axes extending at 45° relative to lines defined by each pair of pins in said remaining rows.

10. The jig system of claim 9 wherein the spacing between remote remaining rows of guide pins is equal to the distance between centerlines of remote conductors of a cable having five conductors.

11. The jig system of claim 1 further including a plurality of locator pins mounted on the base plate in a preselected pattern for selectively aligning cables with three, four and five conductors in relation to the connector strips with the cables in juxtaposed relation to one another.

12. The jig system of claim 1 wherein the guide means includes guide pins mounted on the base plate, and wherein the connector strips are each of a common unique length and have guide pin receiving openings along a major axis of the strip for positioning each strip on the base plate.

13. The jig system of claim 12 wherein each connector strip has a symmetrical array of four eyelets at each longitudinal end of the strip, and wherein centers of the tool apertures of the top plate are spaced apart a distance corresponding to the distance between centers of the eyelet arrays at each longitudinal end of each strip.

14. The jig system of claim 12 wherein each connector strip has an eyelet at opposite longitudinal ends of the strip, and wherein the tool apertures of the top plate are spaced apart a distance corresponding to the distance between eyelets at opposite ends of the strip.

15. The jig system of claim 14 further including an impact tool having a frustoconical head dimensioned and configured to correspond to the eyelet for piercing cable, overlying the eyelet, to wipe and extrude its cable conductor about the eyelet and crimp the eyelet over the extruded conductor to establish a mechanical and electrical connection of high integrity.

16. The jig system of claim 1 further including a plurality of plate alignment posts protruding from one of the top and base plates and a corresponding set of openings formed in the other of the top and base plates for receiving the posts for precision alignment of the plates during use.

17. The jig system of claim 1 wherein the guide means includes guide pins mounted on the base plate, wherein the connector strips each include a plurality of openings along a major axis of the strip for receiving the guide pins and securing the strip in position on the base plate, and wherein the cables are located in overlying relation to the strips.

18. The jig system of claim 17 wherein the strips each include a symmetrical array of eyelets at opposite longitudinal ends of the strip separated by a predetermined distance between centers of the eyelet arrays, and wherein the top plate includes at least a pair of impact tool receiving apertures the centers of which are spaced apart at said predetermined distance.

19. The jig system of claim 18 further including an impact tool having a plurality of projection heads of frustoconical cross section respectively corresponding to each array of eyelets for driving the cable into the eyelet array to simultaneously pierce and wipe a cable conductor and crimp the eyelets of the array over the wiped conductor to establish mechanical and electrical connections of high integrity.

20. A method of interconnecting flat multiconductor cables comprising the steps of providing first and second flat multi-conductors, locating a plurality of connector strips in parallel relation to one another with the strips each having cable perforating means thereon, locating the first and second cables in juxtaposed relation to one another and in overlying relation to the connector strips with the perforating means of each connector strip aligned in registration respectively with different matching conductor pairs of the respective cables, and applying force to the cables overlying the cable perforating means of the connector strips for piercing the overlying cables and making an electrical connection therebetween.

21. The method of claim 20 further including the steps of providing a base plate for locating the connector strips and the cables, and providing an apertured top plate in overlying relation to the base plate with the connector strips and cables sandwiched therebetween, and establishing the regions of the cables to which force is to be applied by apertures in the top plate registering with the perforating means of the connector strips.

22. The method of claim 20 further including the step of providing each connector strip with an eyelet comprising the cable perforating means at opposite longitudinal ends of each strip, and wherein the force applying step includes applying force to the cables overlying the eyelets for piercing the overlying cable to wipe and extrude its cable conductor about each eyelet and crimp it over the extruded conductor to establish a mechanical and electrical connection between a selected conductor pair of the respective cables.

23. The method of claim 20 including the step of positioning a top plate having tool receiving apertures therein, in overlying relation to the base plate with the connector strips and the cables sandwiched therebetween, the positioning step including registering the tool receiving apertures in the top plate in alignment with the connector strip cable perforating means.

* * * * *